United States Patent [19]

Hirano et al.

[11] Patent Number: 4,651,242
[45] Date of Patent: Mar. 17, 1987

[54] MAGNETIC DISK APPARATUS

[75] Inventors: Yoshiyuki Hirano, Yono; Yosuke Seo, Sagamihara; Toyoji Okuwaki, Nishitama; Katsuhiko Kato, Hiratsuka; Takashi Tamura, Kokubunji, all of Japan

[73] Assignee: Hitachi, Ltd., Tokyo, Japan

[21] Appl. No.: 684,294

[22] Filed: Dec. 20, 1984

[30] Foreign Application Priority Data

Dec. 23, 1983 [JP] Japan ................... 58-242011

[51] Int. Cl.⁴ .................. G11B 5/60; G11B 17/32
[52] U.S. Cl. ............................. 360/103; 360/97
[58] Field of Search .................... 360/102–103, 360/104, 109, 97–99

[56] References Cited

U.S. PATENT DOCUMENTS 4,188,645  2/1980  Ragle et al. ............... 360/109 X
4,374,402  2/1983  Blessom et al. .

FOREIGN PATENT DOCUMENTS 57-103159  6/1982  Japan ................... 360/103
58-121177  7/1983  Japan ................... 360/103
59-3745    1/1984  Japan ................... 360/103

*Primary Examiner*—John H. Wolff
*Attorney, Agent, or Firm*—Antonelli, Terry & Wands

[57] ABSTRACT

A magnetic disk apparatus using at least one floating magnetic head which is floated above the surface of a rotating magnetic disk by utilizing dynamic pressure of air caused by the rotation of the magnetic disk, the magnetic disk apparatus comprising, a magnetic head assembly including a magnetic head and a supporting device for supporting the magnetic head to float above the surface of the rotating magnetic disk, the supporting device being provided with a space changing device for changing a space between the magnetic disk surface and the magnetic head, a driver coupled with the space changing device for driving the space changing device, and a controller coupled with the driver for controlling the driving of the space changing device by the driver to change the space between the magnetic head and the magnetic disk surface.

3 Claims, 2 Drawing Figures

MAGNETIC DISK APPARATUS

BACKGROUND OF THE INVENTION

1. Field of the Invention

The present invention relates to a magnetic disk apparatus having a head-crash preventing function.

2. Description of the Prior Art

In magnetic disk apparatus, write and read of information is performed by floating the head above the disk holding a narrow space therebetween by the principle of dynamic pressure bearing. In order to improve the read/write characteristics, this spacing is required to be a minute value equal to or less than 0.5 μm. On the other hand, if the spacing is made small, there is an increasing possibility of occurence of the head-crash accident in which the disk and the head are brought into contact with each other and the recording medium and the head are damaged.

In this instance, in the magnetic disk apparatus, generally, disks are rotated as an assembly which is assembled by stacking several sheets of disks. On the surface of each disk, there are provided one to two heads, and these heads (amounts to a total of 10 to 20) are simultaneously positioned at respective corresponding tracks by a positioning device and perform read/write operations. However, among these heads, it is one head which performs the read/write operation at a time.

Further, a read/write command is delivered from a computer several times in one second per one positioning device (that is per 10 to 20 heads). Still further, one time of read/write operation finishes in less than 50 ms even including a positioning time. In short, a time period in which one head is performing the read/write operation in the working time of the disk apparatus is relatively very short.

Nevertheless, in conventional disk apparatus, all the heads are held always in a floating condition with a narrow space, and hence the possibility of head-crash has been increasing undesirably.

There are floppy disk apparatus as memory units in which the distance between the head and disk surface is changed in the read/write operation. However, in the floppy disk apparatus, the head is held in a contact condition with the disk while the disk is rotating, and consequently wear is caused in both the disk and the head. To cope with such a situation, a measure is employed to separate the head from the recording medium by the use of a solenoid or the like when the read/write operation is not conducted. However, in usual disk apparatus of a large type, data processing speed which is much faster (about 1/10 in time) than that for the floppy is required, and thus if this measure in the floppy disk apparatus is applied, there have been problems in which it takes an excessively long time for the head to be in a floating condition again, and in which there is an increasing possibility of damaging the disk on the contrary, due to a contact of the end of the head with the disk.

SUMMARY OF THE INVENTION

The object of the present invention is to provide a magnetic disk apparatus which is capable of changing a space between the surface of the magnetic disk and the magnetic head floating above that surface in a short time, so that the space between the magnetic disk surface and the magnetic head is held wide when the read/write operation is not conducted, and the space is made a stable narrow one in a short time when the read/write operation is to be performed.

In a magnetic disk apparatus according to the present invention, space changing means for changing the space between a magnetic disk and a magnetic head is provided in a magnetic head assembly which supports the magnetic head above the surface of the magnetic head so that the magnetic head is floated by utilizing dynamic air pressure caused by the rotation of the magnetic disk, and the space is changed by driving the space changing means.

In one embodiment of the present invention, the magnetic head assembly is provided with a spring to apply a load to the magnetic head which is floated by the dynamic air pressure, and piezo-electric elements are used as the space changing means to act on the spring to change the load in accordance with an applied voltage, and the space between the magnetic disk and the magnetic head is made changeable by controlling the voltage applied to the piezoelectric elements, and in this case, since the response of the piezo-electric elements is quick, the space between the magnetic disk and the magnetic head can be changed in a short time.

According to the present invention, in the magnetic disk apparatus, during the time in which no read/write operation takes place, the space between the magnetic head and the magnetic disk surface is held wide to the extent in which a floating force due to the dynamic air pressure between the magnetic head and the magnetic disk is exerted effectively to the magnetic head, that is, while holding the magnetic head in the floating condition, and when the read/write operation is to be conducted, this space can be made to a narrow space for performing the read/write operation in a short time. Where a plurality of magnetic heads are provided in the magnetic disk apparatus, according to the present invention, since it is possible to narrow the space between the magnetic head and the magnetic disk surface for the magnetic head which is used for the read/write operation, and to hold wide the spaces between respective magnetic heads and the magnetic disk surface for the rest of the magnetic heads, the possibility of occurence of the head-crash accident can be reduced to a great extent.

According to the present invention, the space between the magnetic head and the magnetic disk surface can be varied arbitrarily if necessary, and for example, if a projection exists on the surface of the magnetic disk, a magnetic head corresponding to a track on which this projection exists may be held spaced from the magnetic disk. Thus, the present invention can be used to such a situation.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENT

Figure 1:
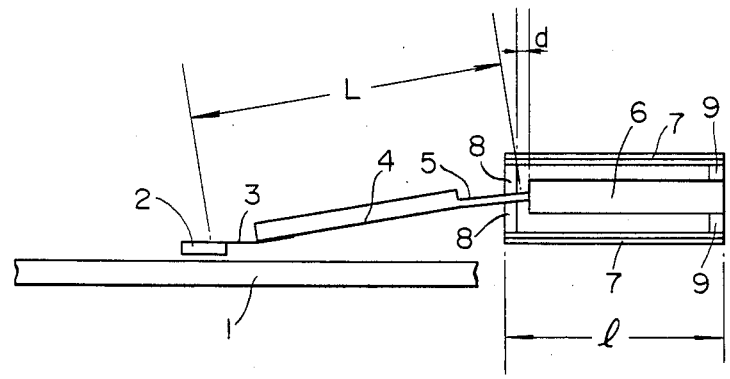
FIG. 1 is a partial schematic diagram of a magnetic head assembly in one embodiment of a magnetic disk apparatus according to the present invention.

FIG. 1 illustrates an arrangement of a magnetic head assembly in one embodiment according to the present invention. The rotational direction of a disk 1 is in a direction perpendicular to the sheet plane of the drawing. A slider 2 of a magnetic head is supported by a flexible gimbal 3 and connected to a load arm 4. The other end portion of the load arm 4 is formed by a leaf spring 5, and the leaf spring 5 is fixed to a guide arm 6. An intermediate portion of the leaf spring 5 and the gimbal 3 has a C-shaped cross section, and which portion has a role to transmit a force with high rigidity. At the base of the leaf spring 5, ends of piezo-electric elements 7 of the so-called bimorph structure in which two piezo-electric plates are cemented together with opposite polarities to each other are respectively in coupled with the leaf spring 5 through respective rigid bodies 8. The other ends of the piezo-electric elements 7 are respectively fixed to the guide arm 6 by means of fixing members 9.

In this structure, the piezo-electric elements 7 are made to sandwich the leaf spring 5 symmetrically at both sides thereof. The reason for is that even when the disk 1 and the slider 2 are displaced in a direction vertical to the disk surface due to thermal expansion and the like, this displacement is prevented from affecting the load. And the respective piezo-electric elements 7 are arranged to have their polarities such that upon application of a voltage, each piezo-electric element 7 causes the leaf spring 5 to be displaced in the same direction vertical to the plane of the disk 1. And by turning ON and OFF the voltage, the load of the leaf spring 5 on the slider 2 is changed.

The embodiment will be described specifically. When the head is floating, the amount of deflection of the leaf spring 5, that is, the displacement of the central portion of the slider 2 from the position thereof when the head is not floating is 5 mm. At this time, the load is 15 gf (gram force), and the space between the magnetic head and the magnetic disk surface is 0.7 $\mu$m. The piezo-electric elements 7 are in contact with the leaf spring 5 at a position spaced from the guide arm 6 by a distance d (e.g., 1 mm). The length l of each piezo-electric element 7 is 30 mm, the thickness t is 1 mm (0.5 mm × two plates are cemented), and by applying a voltage of 320 V, the end of each piezo-electric element 7 displaces 0.1 mm. Supposing that the length L from the slider 2 to the end of the guide arm 6 is 30 mm, by applying the above-mentioned voltage, the amount of deflection of the leaf spring 5 becomes equivalent to that at the position of the slider 2 about 3 mm is increased, and the space between the magnetic head and the magnetic disk surface is reduced to 0.3 $\mu$m. The direction of change of the space is set so that the leaf spring is pushed upward when no voltage is applied.

Figure 2:
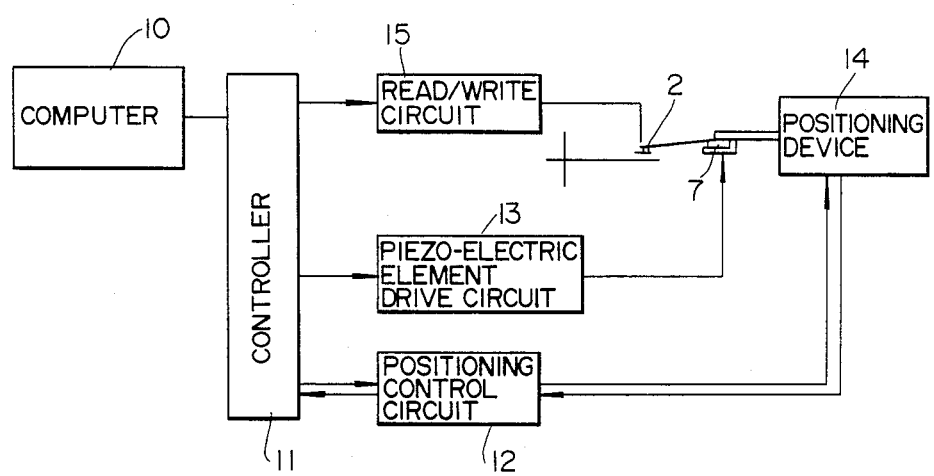
FIG. 2 is a diagram illustrating a control system in the embodiment according to the present invention.

Referring to FIG. 2, the operation of the embodiment will be described. When a read/write command is issued from a computer 10, in response to an instruction from a controller 11, a positioning device 14 is operated by a positioning control circuit 12, and the slider 2 is positioned on a desired track. Further, simultaneously with the start of the positioning operation, the piezo-electric elements 7 are driven by the piezo-electric element drive circuit 13, which is controlled by the controller 11, to achieve the narrow spacing. And, when the completion of the positioning operation is transmitted to the controller 11, a read/write operation is performed by a read/write circuit 15. In the embodiment, since the piezo-electric elements of quick response are used, the space between the magnetic head and the magnetic disk surface is changed in a short time, and therefore, the operation of narrow spacing is performed in a time which is shorter than that which is required in the positioning operation for the shortest distance (a distance to the adjacent track), and thus the positioning operation in this embodiment can be achieved.

In such a case in which the positioning operation is not accompanied and the read/write operation is performed by successively switching the heads, it is possible to eliminate a time lag in the head switching by holding a plurality of sliders floated at the same time respectively with narrow spaces.

Further, where a head for only position detection use is employed, the operation in the present invention can not be applied to such a head since it is required to consecutively read information as to position on the disk. However, if it is possible to reduce the recording density in write in of position information as compared with the recording density of data, it is possible to float the position detection head consecutively with a wider space than that of a data read/write head, and consequently the danger of head-crash can be reduced.

Further, in the foregoing description, the spacing is regulated by changing the amount of the load, however, by using a slider formed by a piezo-electric element and by applying a voltage to crowning it, that is, by bending the slider in a crown shape by applying the voltage, the spacing may be changed.

In this respect, as the slider per se formed by the piezo-electric element, a known slider of this type may be used.

While particular embodiments of the invention have been shown and described, it will be obvious to those skilled in the art that various changes and modifications may be made without departing from the present invention in its broader aspect.

We claim:

1. A magnetic disk apparatus using at least one floating magnetic head which is floated above the surface of a rotating magnetic disk by utilizing dynamic air pressure caused by the rotation of the magnetic disk, said magnetic disk apparatus comprising:

a magnetic head assembly means including a magnetic head and a supporting means for supporting said magnetic head to float above the surface of said rotating magnetic disk, said supporting means being provided with space changing means for changing a space between said rotating magnetic disk surface and said magnetic head;

a driving means coupled with said space changing means for driving said space changing means; and a control means coupled with said driving means for controlling the driving of said space changing means by said driving means to change said space between said magnetic head and said rotating magnetic disk surface in accordance with the utilization of said magnetic head so as to reduce the possibility of occurrence of a head crash.

2. A magnetic disk apparatus according to claim 1, wherein said control means controls said driving means to change said space between said magnetic head and said rotating magnetic disk surface to a predetermined space for reading and writing when data is to be read out of said magnetic disk or data is to be written in said magnetic disk, and said space between said magnetic head and said rotating magnetic disk surface is held to a wider space than said predetermined space when reading or writing is not carried out.

3. A magnetic disk apparatus according to claim 1, wherein said supporting means includes a spring for applying a load to said magnetic head, and said space changing means includes piezo-electric elements which act on said spring to change the load depending on a voltage applied to said piezo-electric elements, and said control means controls the voltage to be applied to said piezo-electric elements.

* * * * *